US005342420A

United States Patent [19]

Bosses

[11] Patent Number: 5,342,420

[45] Date of Patent: Aug. 30, 1994

[54] OPTIONAL DEODORANT DISPENSER FOR VACUUM CLEANER

[75] Inventor: Mark D. Bosses, Montvale, N.J.

[73] Assignee: Home Care Industries, Inc., Clifton, N.J.

[21] Appl. No.: 152,284

[22] Filed: Nov. 12, 1993

[51] Int. Cl.$^5$ .......... B01D 46/02

[52] U.S. Cl. .......... 55/279; D15/246.3; 55/381; 55/DIG. 2

[58] Field of Search .......... 15/246.3; 55/279, 381, 55/382, DIG. 2

[56] References Cited

U.S. PATENT DOCUMENTS

| | | | |
|---|---|---|---|
| 1,828,584 | 10/1931 | Andersen . | |
| 1,881,086 | 10/1932 | Marshall . | |
| 2,598,129 | 5/1952 | MacFarland . | |
| 2,615,754 | 10/1952 | Lindenberg . | |
| 2,759,228 | 8/1956 | Gordon . | |
| 3,274,758 | 9/1966 | Parman . | |
| 3,498,031 | 3/1970 | Fesco | 55/381 X |
| 3,575,345 | 4/1971 | Buck, Jr. . | |
| 3,685,734 | 8/1972 | Paciorek et al. . | |
| 4,065,262 | 12/1977 | Petroff | 55/279 X |
| 4,277,024 | 7/1981 | Spector . | |
| 4,554,698 | 11/1985 | Rennecker | 55/279 X |
| 5,040,264 | 8/1991 | Bryant . | |
| 5,074,997 | 12/1991 | Riley et al. . | |
| 5,104,427 | 4/1992 | Riley et al. . | |

*Primary Examiner*—Charles Hart

*Attorney, Agent, or Firm*—Amster, Rothstein & Ebenstein

[57] ABSTRACT

A dust and dirt collecting apparatus for a vacuum cleaner includes a porous bag defining a dust and dirt collecting enclosure. A releasing strip is disposed on an outer surface of the bag for releasing an active agent (such as a deodorant) into air passing through the vacuum cleaner. A covering associated with the releasing strip is switchable from a first condition blocking release of the active agent by the releasing strip to a second condition enabling release of the active agent by the releasing strip.

10 Claims, 3 Drawing Sheets

OPTIONAL DEODORANT DISPENSER FOR VACUUM CLEANER

BACKGROUND OF THE INVENTION

The present invention relates to replaceable vacuum cleaner bags and, more particularly, to a replaceable vacuum cleaner bag which optionally adds deodorant to the air passing therethrough.

Several products are available that allow the users of vacuum cleaners with disposable vacuum cleaner bags to add an active ingredient to the air which is filtered by their vacuum cleaners. The active ingredient is, broadly speaking, a deodorant. As used herein the term "deodorant" includes true deodorants (which actually neutralize the offending smells), re-odorants (which do not actually neutralize the offensive smells, but rather add more acceptable fragrances into the air to mask the offending smells) and disinfectants (which through their antibacterial activities tend to eliminate the source of the offending smells).

Previous efforts to develop disposable vacuum cleaner bags which would dispense such active ingredients as deodorants into filtered effluents (such as the air passing through the vacuum cleaner) have apparently encountered at least two difficulties: the requirement that the effective action of the active ingredients must be sustained over extended periods of time (including store shelf storage prior to purchase and home storage prior to initial use), and the unacceptably high expenses involved in uniformly applying the requisite high saturation levels of expensive active ingredients.

From a commercial point of view, while most prospective customers will be attracted by the capability of dispensing an active ingredient such as a deodorant into the air passing through the vacuum cleaner, there are those who, at least at one time or another, as a matter of preference or for health reasons, would prefer not to release the active ingredient into such air. While the manufacturer of the bag could make two different bags—one which dispenses the active ingredient and another which does not—the economics of manufacturing two products versus one product and the competition for shelf space in the retail sales outlets suggest the advantages of a single product which will or will not dispense the active ingredient into the air, as desired by the ultimate user. In other words, despite the extra expense involved in adding to the air an active agent dispenser to each vacuum cleaner bag, it is more economical and makes better business sense to make a single product which affords the ultimate user the option of adding the active ingredient or not, as he/she wishes, than to have to manufacture, ship, and stock two different products, one with the dispenser and one without.

Accordingly, it is an object of the present invention to provide a disposable vacuum cleaner bag which, at the option of the ultimate user, either will or will not release an active agent into the air passing through the vacuum cleaner.

Another object is to provide such a bag which does not release the active agent until the decision of the ultimate user and therefore does not waste the active ingredient during storage prior to initial use (both prior to and after purchase).

SUMMARY OF THE INVENTION

It has now been found that the above and related objects of the present invention are obtained in a dust and dirt collecting apparatus for a vacuum cleaner comprising a porous bag defining a dust and dirt collection enclosure. A releasing means is disposed on an outer surface of the bag for releasing an active agent (e.g., a deodorant) into air passing through the vacuum cleaner, and means associated with the releasing means is switchable from a first condition blocking release of the active agent by the releasing means to a second condition enabling release of the active agent by the releasing means.

In a preferred embodiment of the present invention, the releasing means includes a porous substrate and the active agent thereon. The bag has an outer surface, and the substrate is secured to the bag outer surface. The releasing means has an outer surface, and the associated means is a strip having on an inner surface thereof a porous substrate releasably adhesively secured to the outer surface of the releasing means. Air-tight microcapsules containing the active agent are part of the releasing means and are secured to the associated means such that switching of the associated means from the first condition to the second condition ruptures the microcapsules to release the active agent therefrom.

Preferably the bag defines an air inlet, and the releasing means is disposed adjacent the bag air inlet.

BRIEF DESCRIPTION OF THE DRAWING

The above and related objects, features, and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Contemporary vacuum cleaners from a variety of manufacturers employ a variety of configurations of disposable filter paper vacuum cleaner bags with design configurations that will vary dependent on such factors as whether the vacuum cleaner employing the air-porous bag is an upright or canister style vacuum cleaner configuration, and, if an upright design, then whether the dust and dirt is top-filled into the bag or is blown up into the bag. Air containing this dust and dirt is directed into the interior of the bag through a tube which extends from the impeller of the vacuum cleaner. The pressure of the air injected into the bag from the tube is greater than atmospheric pressure, which causes the air in the bag's interior to escape as an effluent flow from the bag by passing through the porous filter material of the bag. The bag is retained by the tube by means of a restraining ring or other bag-positioning device. The pattern of pressures and rates of flow of air effluent from the bag will be contingent on a variety of factors, including: the amount of dirt retained in the bag; the air flow impedances or resistance imposed by the shape and size of the chamber of container in which the bag is retained; the design of the vacuum cleaner; the degree of coarseness and fibrous content of the dirt and other materials within the dust and dirt collecting enclosure inside the bag after it has been in use; the weight, thickness, and porosity of the filter paper material; and the pattern of construction of the bag itself.

Figure 1:
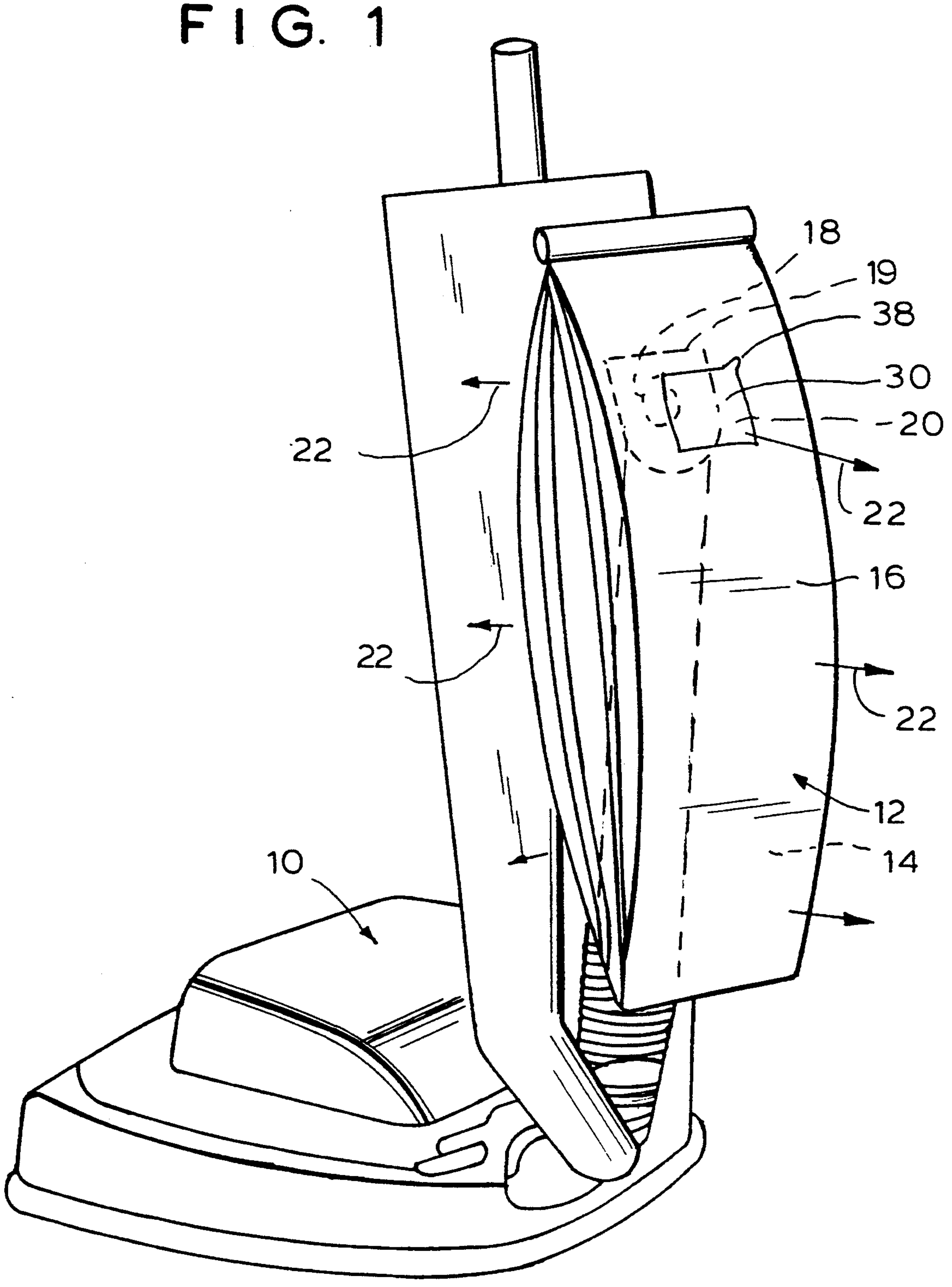
FIG. 1 is an isometric view of a vacuum cleaner with a disposable bag according to the present invention.
Figure 2:
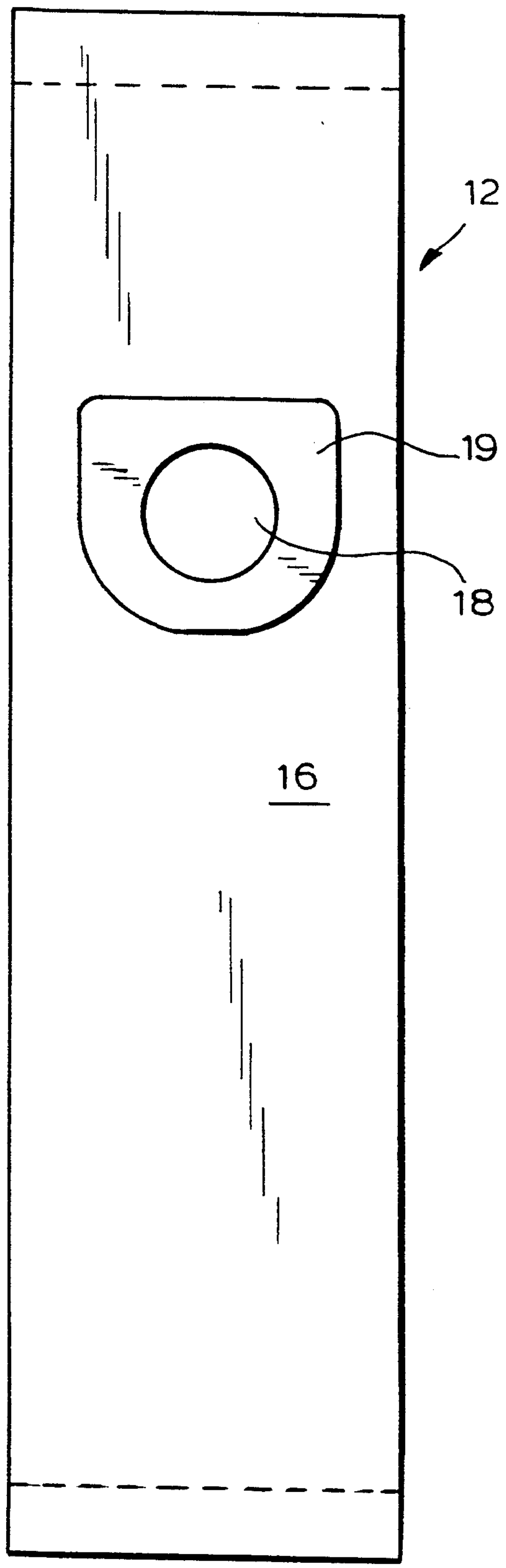
FIG. 2 is a front elevational view of the bag.
Figure 3:
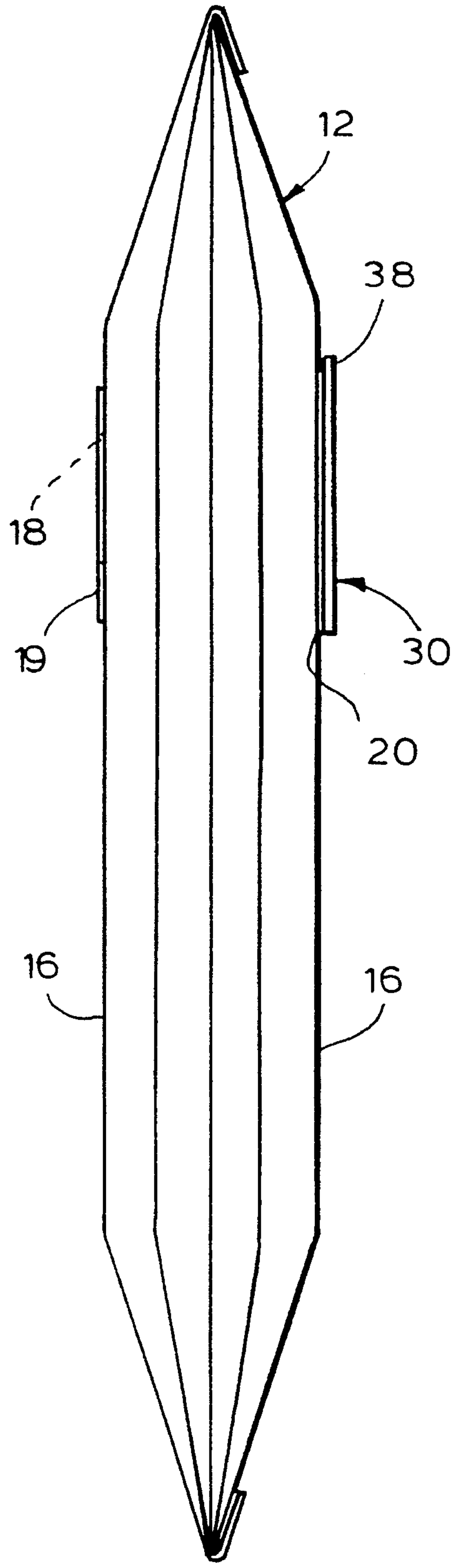
FIG. 3 is a side elevational view of the bag.
Figure 4:
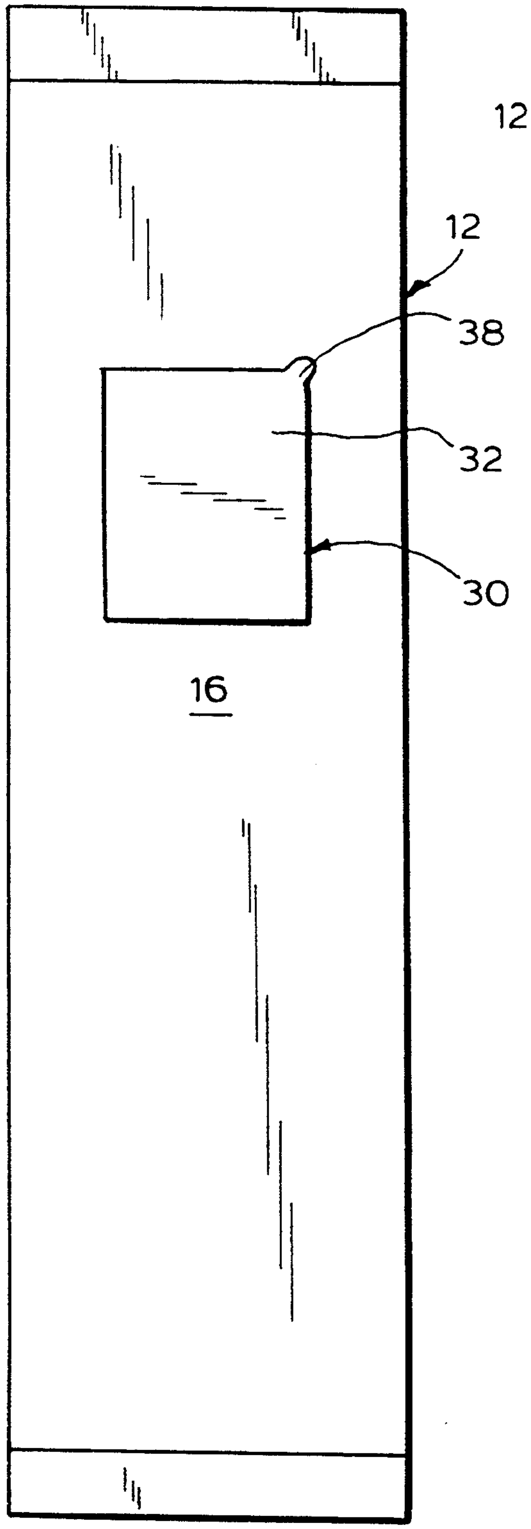
FIG. 4 is a back elevational view of the bag.

Referring now to the drawing, and in particular to FIG. 1 thereof, therein illustrated is a vacuum cleaner, generally designated by the reference numeral 10, including a dust and dirt collecting apparatus according to the present invention, generally designated 12. The apparatus 12 comprises a porous bag defining a dust and dirt collecting enclosure 14. The bag 12 is preferably a disposable paper filter vacuum cleaner bag of one of the configurations described above, the bag 12 further defining the dust and dirt collecting enclosure 14 therewithin, an outer surface 16 therewithout and an air inlet 18 leading into the enclosure 14. As best seen in FIG. 2, a stiffener 19, such as cardboard, may be secured to bag 12 about the air inlet 18 to facilitate operative connection of the bag air inlet 18 to the vacuum cleaner 10.

Figure 5:
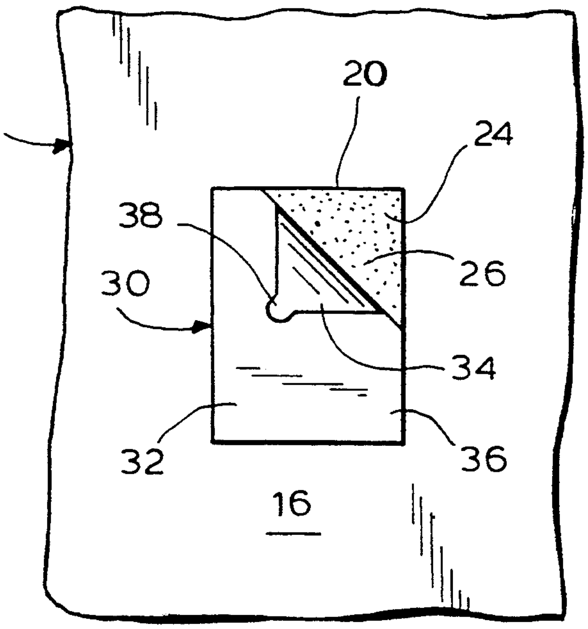
FIG. 5 is a fragmentary back elevational view of the bag to an enlarged scale and with the associated means partially removed.

Disposed on the bag outer surface 16 is a releasing means 20 for releasing an active agent into the air passing through the vacuum cleaner 10 (the air flow being indicated by arrows 22). As best seen in FIG. 5, the releasing means 20 typically comprises a porous substrate 24 having the active agent thereon or therein and an outer surface 26. The substrate 24 is preferably secured to the bag outer surface 16 by an adhesive (optimally a porous adhesive), sewing, or the like. Preferably the releasing means 20 is permanently secured to the bag outer surface 16 so that it cannot be separated therefrom, and may in fact form a part of the surface of the dust and dirt collecting enclosure 14. While the releasing means 20 may be disposed anywhere on the bag outer surface 16, it is preferably disposed adjacent the bag air inlet 18 (e.g., opposite thereto). In this manner, the air flow through the releasing means 20 does not diminish as the bag begins to fill with dust and dirt and, for reasons which will be apparent hereinafter, the releasing means 20 is in ready view of the ultimate user when he/she places the bag 12 in the vacuum cleaner 10.

An active ingredient is (or active ingredients are) released from the releasing means 20 into the effluent material which has passed therethrough. The active ingredient can be defined as a functional ingredient or an ingredient which is released from the material of the releasing means to perform some function. Thus, for example, when the active ingredient is used primarily to re-odorize or deodorize the air passing through the filter paper of a disposable vacuum cleaner bag, the active ingredients might comprise essential oils (such as pine oil, thyme oil or lemon oil), while necessary but secondary functions might call for inclusion of such ingredients as flame-retardant antioxidation agents to prevent spontaneous combustion of these oils (such as organic salts, ammonium sulfamate, zinc borate, antimony oxychlorendic anhydride, alumina trihydrate, organic phosphates and phosphonates), food preservative agents to prevent rancidification of the essential oils (such as calcium propionate, calcium disodium EDTA, sodium benzoate, sodium tripolyphosphate, sodium phosphate, citric acid, ascorbic acid, BHA, and BHT), anti-bacterial, bactericidal, or bacteriostatic agents to further retard the rancidification of the essential oils (such as phenolic compounds, alcohols, aldehydes such as formaldehyde, propionic and benzoic acids, halogenated compounds including chlorine, hypochlorite, and Iodine, salts of such metals as copper and mercury, including organic mercurials, and surfactants like benzalkonium and cetylpyridinium), other stabilizers and extenders of the oils (such as dyes, drying oils like soybean and cottonseed, mineral oils such as dipropylene glycol, petrolatum and glycerine, and alcohols), or any compound or solution of these ingredients. An active ingredient might be a bacteriostatic or antibacterial disinfecting agent, such as pine oil or thyme oil, by itself.

It is a critical feature of the present invention that there be means, generally designated 30, functionally associated with the releasing means 20 and switchable from a first condition blocking release of the active agent by the releasing means 20 to a second condition enabling release of the active agent by the releasing means 20.

In a preferred embodiment of the present invention, the associated means 30 is a strip having a porous substrate 32 with an inner surface 34, and an outer surface 36, and a tab 38 to facilitate removal of strip 30 from the releasing means 20. In the first condition referenced above, except for tab 38, the inner surface 34 is releasably secured to the outer surface 26 of the releasing means 20. Thus even when the associated means 30 is in place on the releasing means 20 in order to prevent release of the active agent into the air passing through the vacuum cleaner 12, air from the bag enclosure 14 can pass through the releasing means 20 and associated means 30, so that there is no diminishment of the air flow capacity of the bag 12. The active ingredient is disposed on the releasing means substrate 24 as microcapsules. The microcapsules are part of the releasing means 20, but are also secured to the associated means 30 so that, when the associated means 30 is displaced from the releasing means 20 by the ultimate consumer (i.e., forced to assume the second condition referenced above), the microcapsules rupture and release the active ingredient into the air.

Microcapsules come in a wide variety of different configurations and sizes, including microtubules, microspheres, polymer inclusions, and the like, for example, as taught by many patents of the 3M Company. The active agents most commonly encapsulated are inks and perfumes. Indeed, fragrance samplers included in magazines and the like typically include such microcapsules filled with scent and disposed intermediate a pair of opposing substrates, with different portions of each microcapsule being secured to each of the substrates so that, when the substrates are eventually separated by the reader, the microcapsules break and release the scent. For the purposes of the present invention, the substrates are preferably porous to air. There exists a wide variety of manufacturing techniques for creating such microcapsules secured to different substrates, for adjusting the force required to separate the substrates, for selecting the appropriate polymer materials for encapsulating particular active agents, etc. These techniques are well known in the micro-encapsulation art and hence need be set forth herein in further detail.

The associated means 30 may take any of a wide variety of different forms. For example, it may simply be a non-porous strip which is secured on or over a portion of the releasing means outer surface 26 so as to preclude, or at least minimize, air flow through the releasing means 20. When such non-porous associated means are disposed on or over the releasing means 20, there is little, if any, air flow through the releasing means 20 and hence no release of the active ingredient into the air. On the other hand, when the associated means 30 is removed from the releasing means 20 and its environment, air flow is enabled through the releasing means 20 so that the active ingredient enters the air passing through the vacuum cleaner 12. The disadvantage of this technique is that in the event the ultimate user does not wish to have the active ingredient enter the air flow, then the effectively porous surface area of the bag 12 has been diminished by the area occupied by the associated means 30. A further disadvantage of this technique is that the active agent escapes from the sides of the releasing means 20 due to the air pressure within the bag enclosure 14, thus providing some level of active agent in the air passing through the vacuum cleaner, albeit at a reduced level. On the other hand, this technique lends itself to reversibility with the associated means being replaceable over the releasing means 20, thereby affording the ultimate user the option to have the active ingredient in the air passing through the vacuum cleaner at selected times and not at other times.

To summarize, the present invention provides a disposable vacuum cleaner bag which, at the option of the ultimate user, either will or will not release an active agent (such as a deodorant, disinfectant or the like) into the air passing through the vacuum cleaner. The bag does not release the active agent until activated by the ultimate user and therefore does not waste the active ingredient during storage prior to initial use (either prior to or after purchase).

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A dust and dirt collecting apparatus for a vacuum cleaner, comprising:
(A) a porous bag defining a dust and dirt collecting enclosure;
(B) releasing means disposed on an outer surface of said bag for releasing an active agent into air passing through the vacuum cleaner; and
(C) means associated with said releasing means and switchable from a first condition blocking release of the active agent by said releasing means to a second condition enabling release of the active agent by said releasing means.

2. The apparatus of claim 1 wherein said releasing means includes a porous substrate and the active agent thereon.

3. The apparatus of claim 2, wherein said bag has an outer surface, and said substrate is secured to said bag outer surface.

4. The apparatus of claim 3 wherein said releasing means has an outer surface, and said associated means is a strip having on an inner surface thereof a porous substrate releasably adhesively secured to said outer surface of said releasing means.

5. The apparatus of claim 4 wherein air-tight microcapsules containing the active agent are part of said releasing means and are secured to said associated means such that switching of said associated means from said first condition to said second condition ruptures said microcapsules to release the active agent therefrom.

6. The apparatus of claim 1 wherein said releasing means has an outer surface and said associated means is a strip having on an inner surface thereof a porous substrate releasably adhesively secured to said outer surface of said releasing means.

7. The apparatus of claim 1 wherein said bag defines an air inlet, and said releasing means is disposed adjacent said bag air inlet.

8. The apparatus of claim 1 wherein the active agent is located within air-tight microcapsules disposed on said releasing means and secured to said associated means such that switching of said associated means from said first condition to said second condition ruptures said microcapsules to release the active agent therefrom.

9. The apparatus of claim 1 wherein the active agent is a deodorant.

10. A dust and dirt collecting apparatus for a vacuum cleaner, comprising:
(A) a porous bag defining an outer surface, a dust and dirt collecting enclosure, and an air inlet;
(B) releasing means disposed on said bag outer surface adjacent said bag air inlet for releasing an active agent including a deodorant into air passing through the vacuum cleaner, said releasing means including a porous substrate secured to said bag outer surface, the active agent thereon, and an outer surface; and
(C) means associated with said releasing means and switchable from a first condition blocking release of the active agent by said releasing means to a second condition enabling release of the active agent by said releasing means, said associated means including a strip having on an inner surface thereof a porous substrate releasably adhesively secured to said outer surface of said releasing means;
air-tight microcapsules containing the active agent being part of said releasing means and being secured to said associated means such that switching of said associated means from said first condition to said second condition ruptures said microcapsules to release the active agent therefrom.

* * * * *